United States Patent
Hirano

(10) Patent No.: US 9,481,094 B2
(45) Date of Patent: Nov. 1, 2016

(54) ARM COMPONENT AND INDUSTRIAL ROBOT EMPLOYING SAME

(71) Applicant: YAMAHA HATSUDOKI KABUSHIKI KAISHA, Shizuoka-ken (JP)

(72) Inventor: Akifumi Hirano, Shizuoka (JP)

(73) Assignee: YAMAHA HATSUDOKI KABUSHIKI KAISHA, Shizuoka-ken (JP)

( * ) Notice: Subject to any disclaimer, the term of this patent is extended or adjusted under 35 U.S.C. 154(b) by 333 days.

(21) Appl. No.: 14/043,641

(22) Filed: Oct. 1, 2013

(65) Prior Publication Data
US 2014/0090508 A1 Apr. 3, 2014

(30) Foreign Application Priority Data

Oct. 3, 2012 (JP) ................................ 2012-221099

(51) Int. Cl.
*B25J 9/00* (2006.01)
*B25J 18/00* (2006.01)
(Continued)

(52) U.S. Cl.
CPC ............... *B25J 17/00* (2013.01); *B25J 9/0051* (2013.01); *B25J 17/0275* (2013.01); *B25J 18/00* (2013.01); *Y10T 74/20329* (2015.01)

(58) Field of Classification Search
CPC ...... B25J 9/0051; B25J 9/06; B25J 17/0275; B25J 9/003; B25J 9/0033; B25J 9/106; B25J 9/1065
USPC .............. 74/490.01, 490.05; 901/15, 27, 28; 24/594.1, 594.11, 599.6, 599.7, 628, 24/677; 403/315–320
See application file for complete search history.

(56) References Cited

U.S. PATENT DOCUMENTS 6,324,941 B1 * 12/2001 Ho .......................... B62M 3/086
74/594.4
6,419,211 B1 7/2002 Hvittfeldt et al.
(Continued)

FOREIGN PATENT DOCUMENTS

DE 10 2008 019966 A1 10/2009
DE 10 2008 025845 A1 12/2009
(Continued)

OTHER PUBLICATIONS

The extended European search report issued on Feb. 18, 2014, which corresponds to European Patent Application No. 13004622.0-1712 and is related to U.S. Appl. No. 14/043,641.
(Continued)

*Primary Examiner* — Victor Macarthur
*Assistant Examiner* — Bobby Rushing, Jr.
(74) *Attorney, Agent, or Firm* — Studebaker & Brackett PC

(57) ABSTRACT

An arm member has: a first rod and a second rod each of which has a rod side joint portion which is assembled with the counterpart joint portion; and a connecting member which interconnects the two rods. The assembled state of the rod side joint portion with the counterpart joint portions is released by separating the two rods from each other for a predetermined distance or more. The connecting member includes: a first connecting piece disposed on the first rod; a second connecting piece disposed on the second rod; a spring member which is installed between the two connecting pieces and biases the two rods in directions to approach each other; and a regulating member that regulates displacement of the two rods in the departing directions, so that the distance between the two rods becomes less than the predetermined distance.

4 Claims, 8 Drawing Sheets

(51) Int. Cl.
*B25J 17/00* (2006.01)
*B25J 17/02* (2006.01)

(56) References Cited

U.S. PATENT DOCUMENTS

| | | | |
|---|---|---|---|
| 6,431,019 B1* | 8/2002 | Greene | B25J 9/06 |
| | | | 267/70 |
| 8,973,459 B2* | 3/2015 | Fukudome | B25J 17/0266 |
| | | | 74/490.01 |
| 2004/0143876 A1 | 7/2004 | Persson et al. | |
| 2010/0037721 A1 | 2/2010 | Nakao et al. | |
| 2010/0263471 A1 | 10/2010 | Weber | |

FOREIGN PATENT DOCUMENTS

| | | |
|---|---|---|
| JP | S61-24893 U | 2/1986 |
| JP | S63-259234 A | 10/1988 |
| JP | H10-34584 A | 2/1998 |
| JP | 2002-529258 A | 9/2002 |
| JP | 2002-532269 A | 10/2002 |
| JP | 2009-097571 A | 5/2009 |
| JP | 2010-247324 A | 11/2010 |
| JP | 2011-194534 A | 10/2011 |
| KR | 2009-0098611 A | 9/2009 |
| KR | 10-1036836 B1 | 5/2011 |
| KR | 10-1179046 B1 | 9/2012 |
| WO | 98/10204 A1 | 3/1998 |
| WO | 2009/027660 A2 | 3/2009 |

OTHER PUBLICATIONS

An Office Action issued by the Korean Patent Office on Sep. 29, 2014, which corresponds to Korean Patent Application No. 10-2013-0117723 and is related to U.S. Appl. No. 14/043,641; with English language summary.

The First Office Action issued by the Chinese Patent Office on May 6, 2015, which corresponds to Chinese Patent Application No. 201310439205.5 and is related to U.S. Appl. No. 14/043,641; with English language summary.

An Office Action; "Notification of Reasons for Refusal," issued by the Japanese Patent Office on May 10, 2016, which corresponds to Japanese Patent Application No. 2012-221099 and is related to U.S. Appl. No. 14/043,641; with English language translation.

* cited by examiner

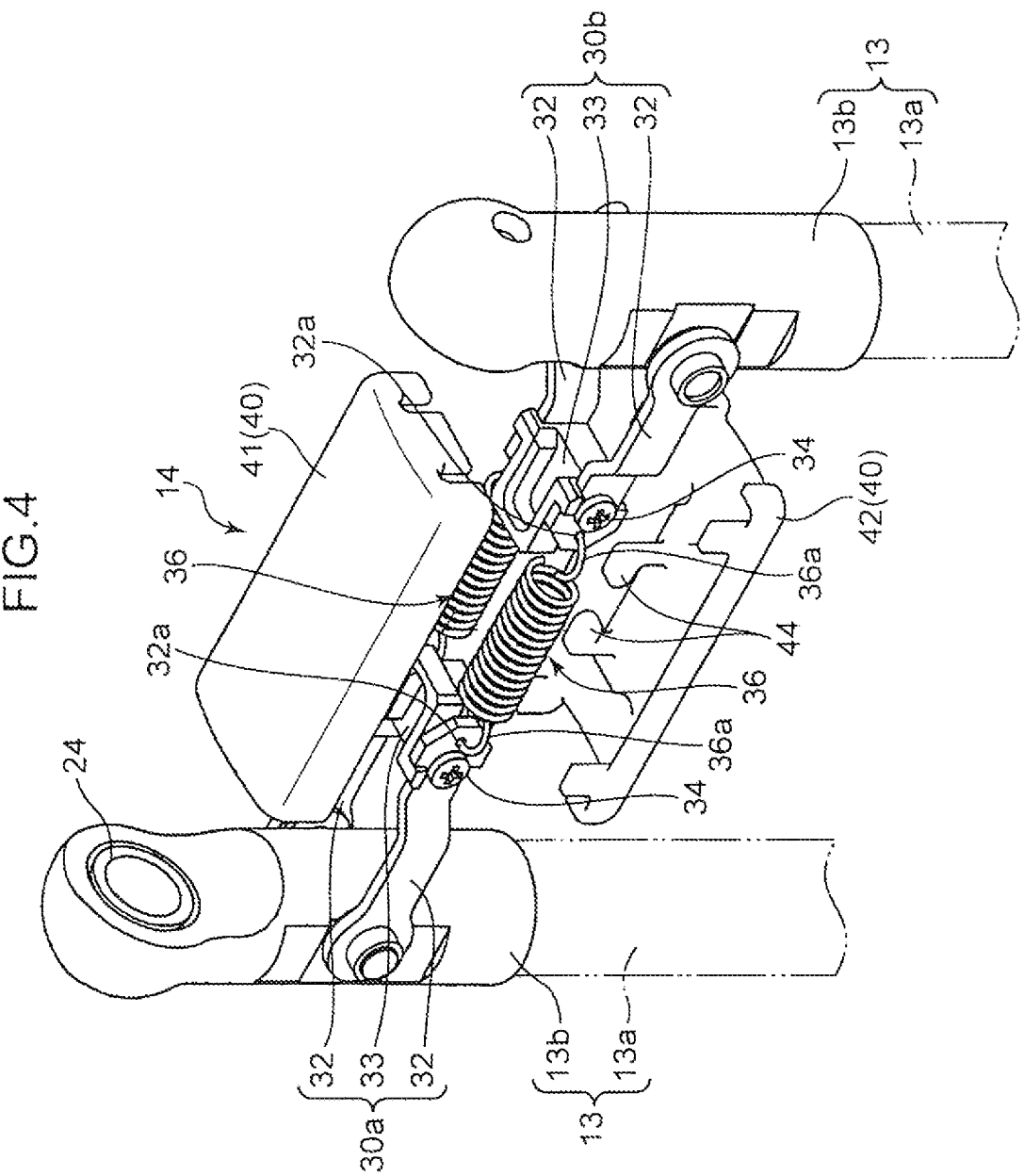

US 9,481,094 B2

ARM COMPONENT AND INDUSTRIAL ROBOT EMPLOYING SAME

BACKGROUND OF THE INVENTION

1. Field of the Invention

The present invention relates to an industrial robot using a parallel link mechanism.

2. Background Art

A known industrial robot using a parallel link mechanism (hereafter called "robot") is disclosed in Japanese Translation of PCT Application No. 2002-532269. This robot includes a base unit, which is a support base, a plurality (three) of first arms which oscillate around the horizontal axis respectively by driving of a motor secured on the base unit, and second arms which respectively connect the first arms to one head unit (end effector). The position and attitude of the head change by the first arms that are driven in a collaborative manner.

In this kind of robot, each of the second arms is connected to the first arm and the head unit via a ball joint. To be more specific, the second arm is configured by a pair of rods, and cup type sockets are disposed at both ends of each rod so as to face each other. A pair of ball studs, which constitute a ball joint with the socket, is secured to the first arm and the like, so as to face away from each other. The second arm is connected to the first arm and the like by the socket of each rod fitting into the ball head portion of the ball stud from the outside.

In order to secure a wider movable area of the second arm, and in order to easily remove the head unit for cleaning and maintenance, the socket of each rod is formed to be relatively shallow, therefore each rod constituting the second arm has a connecting member disclosed in Japanese Translation of PCT Application No. 2002-529258 so as to maintain the connection between the second arm (rod) and the first arm and the like. This connecting member is configured so as to pull both rods closer by the elastic force of a spring. In other words, the connecting member pushes the socket toward the ball stud (ball head portion), so as to maintain the connection of the second arm (rod) and the first arm and the like. For maintenance, this connecting member makes it relatively easier to remove the second arm from the first arm, or to remove the head unit from the second arm by releasing each rod from the elastic force of the spring.

However in the case of the robot having the connecting member disclosed in Japanese Translation of PCT Application No. 2002-529258, if the second arm performs sudden movement due to rapid acceleration, for example, or if the second arm collides with an obstacle, the rods constituting the second arm may be unintentionally widely separated, and at worst the second arm may fall out from the first head, or the head unit may be disconnected from the second arm.

Furthermore, the connecting member disclosed in Japanese Translation of PCT Application No. 2002-529258 is attached to the rods by the hooks at both ends that are each hooked to the engaging portion of each rod. Therefore if the second arm performs sudden movement due to rapid acceleration, for example, the hook may disengage from the engaging portion, and such a problem as the second arm falling off from the first arm may occur, as described above.

SUMMARY OF THE INVENTION

It is an object of the present invention to prevent with certainty such a problem as an arm falling off during robot operation, and allows easy removal or disassembly of the arm when necessary, such as for maintenance.

An arm member according to an aspect of the present invention is an arm member that is connected to counterpart members each having a pair of counterpart joint portions which faces the opposite side from each other, including: a first rod and a second rod each of which has a rod side joint portion which constitutes a ball joint, in collaboration with the counterpart joint portion, and is connected to the counterpart members by the rod side joint portion that is assembled with the counterpart joint portion; and a connecting member which interconnects the first rod and the second rod which are each connected to the counterpart members, at predetermined positions in the axis direction thereof, wherein the assembled state of the rod side joint portion with the counterpart joint portion is released by separating the two rods, which are connected to the counterpart members, from each other for a predetermined distance or more, and the connecting member includes: a first connecting piece disposed on the first rod; a second connecting piece disposed on the second rod; a spring member which is installed between the two connecting pieces and biases the two rods in directions to approach each other; and a regulating member that is removably installed between the two connecting pieces for regulating displacement of the two rods in departing directions, so that the distance between the two rods becomes less than the predetermined distance.

BRIEF DESCRIPTION OF THE DRAWINGS

FIG. 4 is a perspective view (partially exploded view) depicting a connecting member;

DETAILED DESCRIPTION OF THE PREFERRED EMBODIMENTS OF THE INVENTION

An embodiment of the present invention will now be described with reference to the accompanying drawings.

Figure 1:
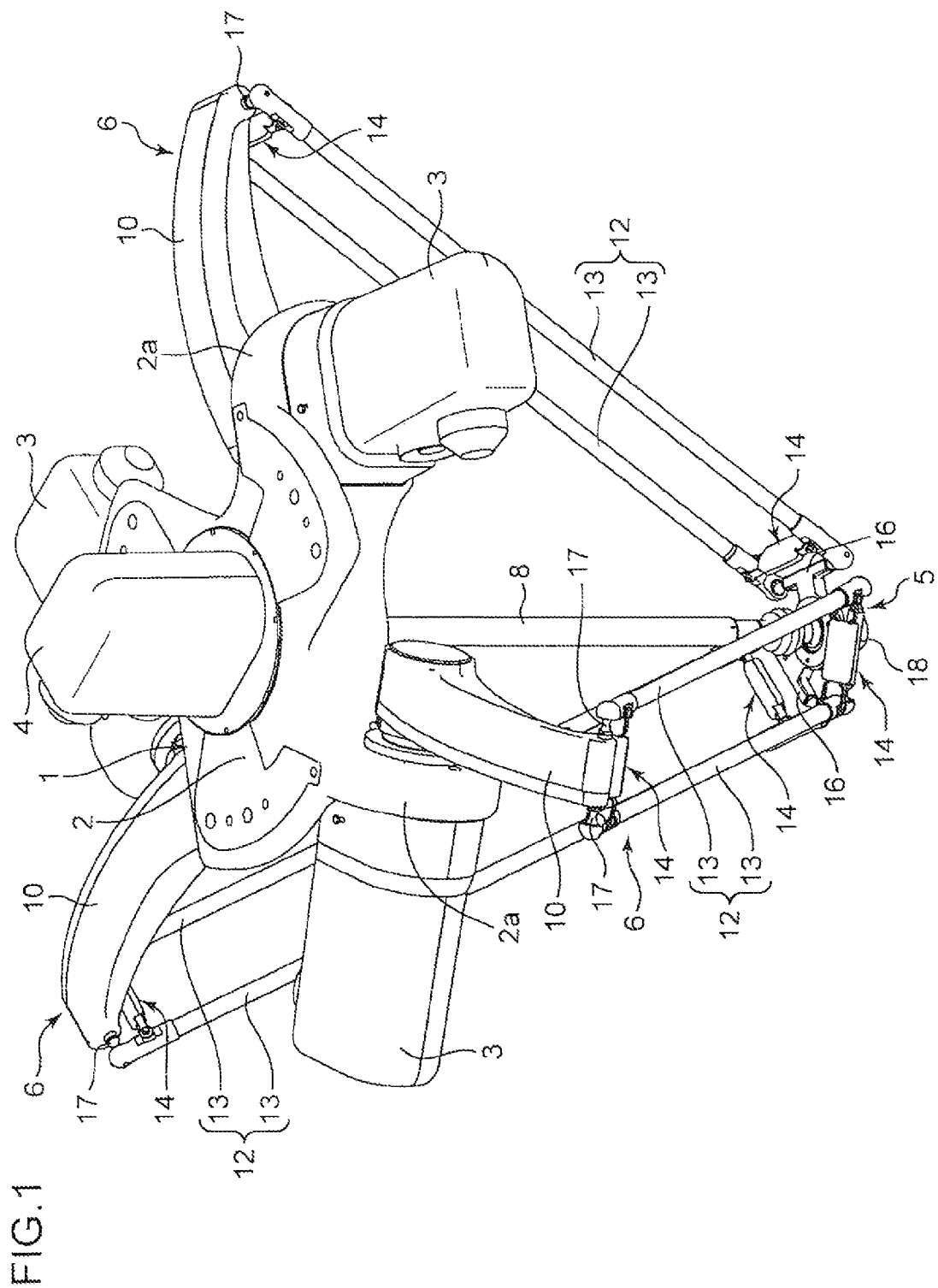
FIG. 1 is a perspective view of an industrial robot according to the present invention (industrial robot to which an arm member of the present invention is applied)
Figure 2:
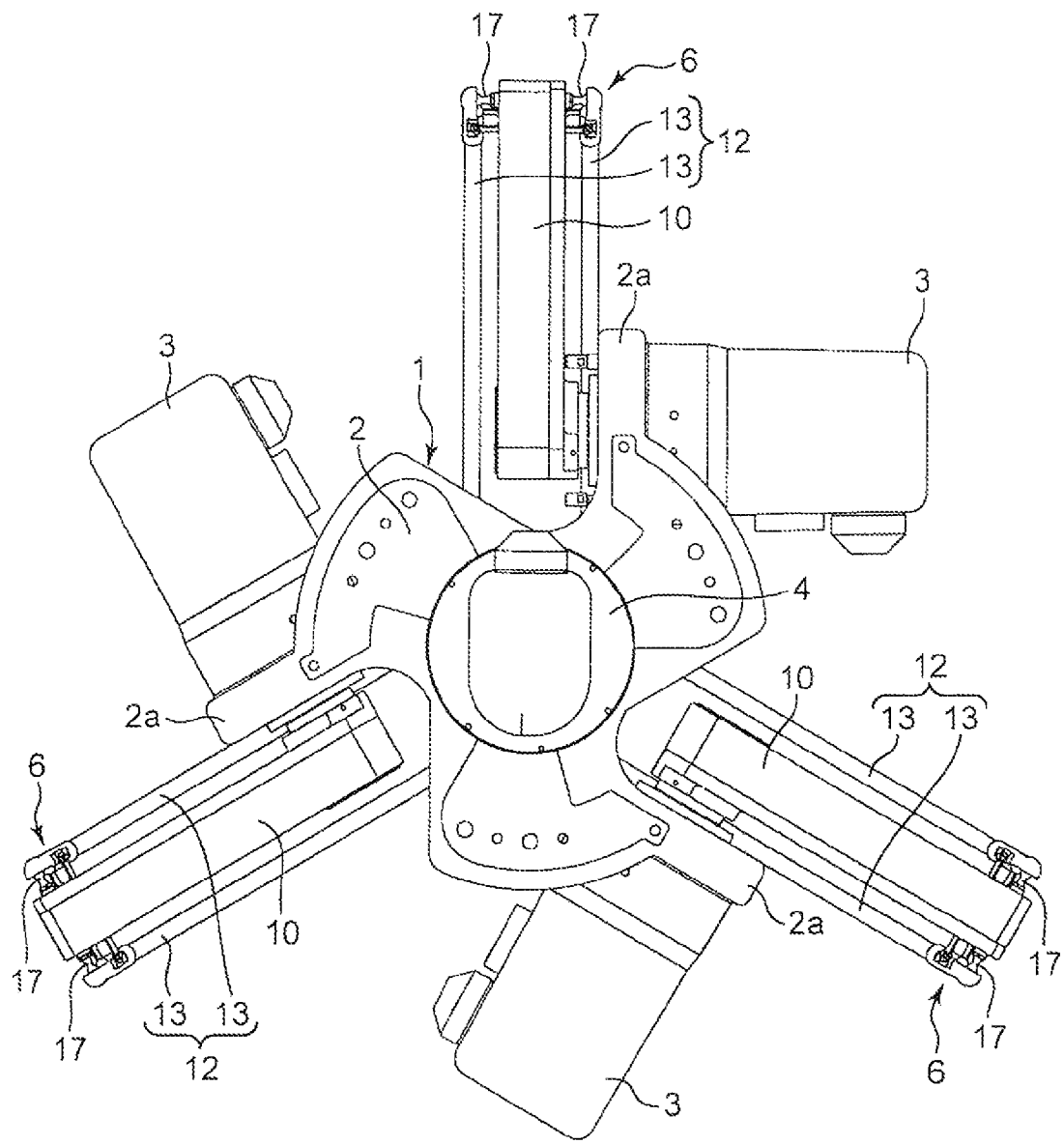
FIG. 2 is a plan view of the industrial robot.

FIG. 1 and FIG. 2 show an industrial robot according to the present invention (industrial robot to which an arm member of the present invention is applied). FIG. 1 is a perspective view and FIG. 2 is a plan view each depicting the industrial robot. As FIG. 1 and FIG. 2 show, the industrial robot (hereafter called "robot") is a robot using a parallel link mechanism. The robot of this example is used for selecting an article. In other words, the robot is secured to a ceiling in a suspended state, or secured to a tower-like frame member (not illustrated) in a suspended state. Then using the suction of a later mentioned nozzle member 18, the robot picks up and selects articles which are transported by a transporting unit, such as a belt conveyer, which is disposed below the robot.

The robot has a base unit 1 which is a support base secured to the ceiling or the frame member, a head unit 5 which is an end effector located below the base unit 1, and three arms 6 which connect the base unit 1 and the head unit 5 and can bend respectively, and the position and orientation of the head unit 5 can be changed by driving each arm 6 individually in a collaborative manner. The robot also has a rotation shaft 8 which vertically extends and connects the base unit 1 and the head unit 5, and as mentioned later, the rotary driving force is applied to a later mentioned nozzle member 18 of the head unit 5 via the rotation shaft 8.

As FIG. 1 and FIG. 2 show, the base unit 1 includes a base main unit 2, an arm driving motor 3 that drives the arms 6, and an axis driving motor 4 that drives the rotation shaft 8.

The base main unit 2 has a substantially screw shape in a plan view, and the axis driving motor 4 is secured at the center of the top face of the base main unit 2 in a state where the output axis faces down.

The base main unit 2 has three motor securing portions 2a on the peripheral, which are disposed in the circumferential direction at equal intervals (120° interval), and extends outward. In each of the motor securing portions 2a, the arm driving motor 3 is secured sideways, in other words, in a position where the output axis of the arm driving motor 3 extends horizontally, and the arm 6 is connected to the output axis of the arm driving motor 3 respectively.

Each arm 6 is configured by a first arm 10 which is secured to the output axis of the arm driving motor 3, and is driven around the horizontal axis by the arm driving motor 3, and a second arm 12 which is connected between the first arm 10 and the head unit 5 (corresponding to the arm member of the present invention). In this example, the first arm 10 and the head unit 5 are counterpart members of the present invention respectively.

The second arm 12 includes a pair of rods 13 (corresponding to the first rod and second rod of the present invention) and a connecting member 14 which connects the rods 13 at a predetermined position in the axis direction of the rods.

As mentioned later, each rod 13 has a later mentioned socket 24 (corresponding to the rod side joint portion of the present invention) which constitutes a ball joint, in collaboration with a later mentioned ball stud 17 (corresponding to the counterpart joint portion of the present invention) of the first arm 10 and the head unit 5, and is connected to the first arm 10 and the head unit 5 by the socket 24 that is assembled with the ball stud 17. Thereby the second arm 12 is connected to the first arm 10 and the head unit 5 allowing oscillation.

Figure 3:
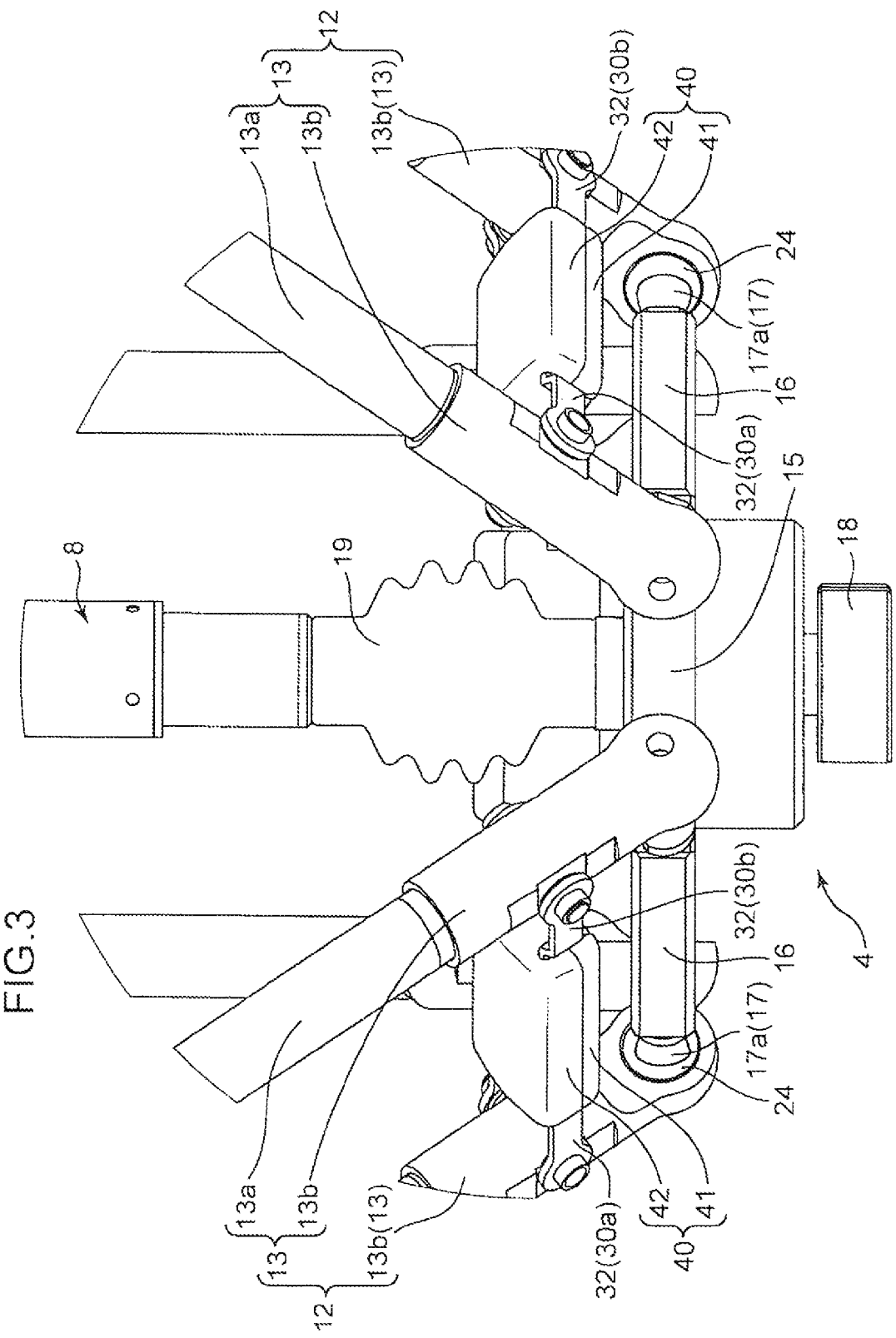
FIG. 3 is an enlarged side view depicting a head unit (end effector) of the industrial robot.

As FIG. 3 shows, the head unit 5 includes a substantially plate type bracket 15 to which the arm 6 (the second arm 12) is connected and a nozzle member 18 that uses suction to pick up articles, that is rotatably held at the center of the bracket 15 via a bearing. The tip (lower end) of the rotation shaft 8 is connected to the nozzle member 18 via a universal joint 19, while the base (upper end) of the rotation shaft 8 is connected to the output axis of the axis driving motor 4 via a universal joint (not illustrated). Because of this configuration, the nozzle member 18 is rotary driven by the axis driving motor 4 via the rotation shaft 8. The rotation shaft 8 has a telescopic mechanism that is extendable, and extends and contracts following up the displacement of the head unit 5.

Now the configuration of the second arm 12 constituting the arm 6, and the connection structure of the second arm 12 with the base unit 1 and the head unit 5 will be described in detail with reference to FIG. 3 to FIG. 6.

As mentioned above, the second arm 12 is configured by the pair of rods 13 and the connecting member 14 which interconnects these rods 13 at a predetermined position in the axis direction thereof.

As FIG. 3 to FIG. 5A and FIG. 5B show, each rod 13 is configured by a cylindrical rod main unit 13a which is formed of light material, such as carbon fiber, and an end cap 13b which is secured to both ends of the rod main unit 13a respectively.

Figure 5A:
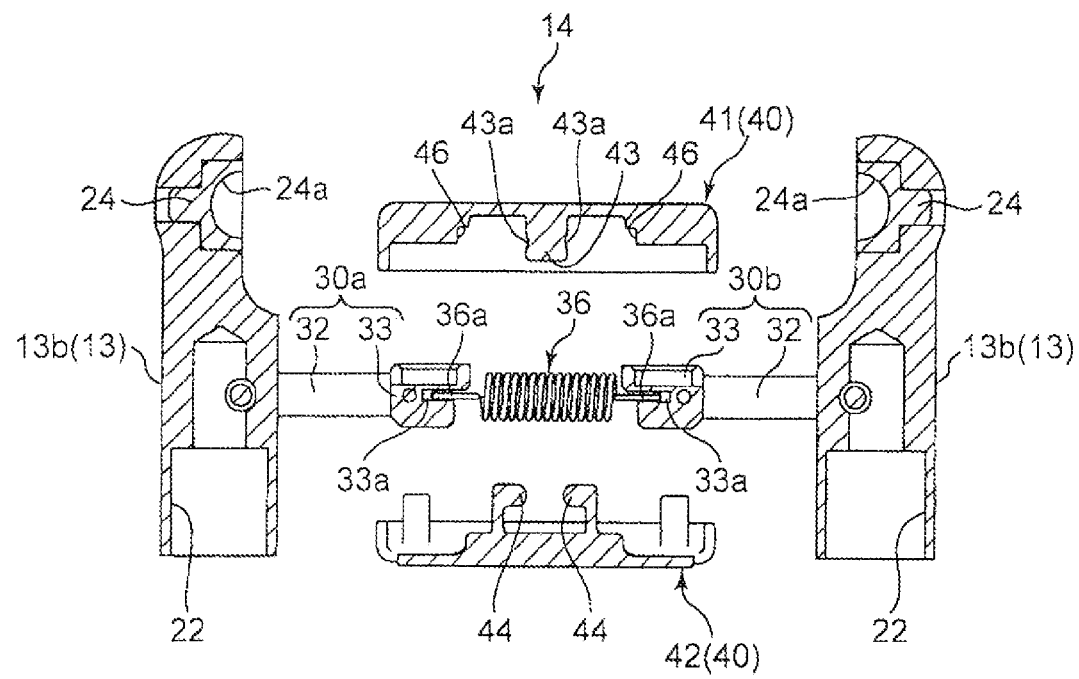
FIG. 5A is a cross-sectional view (partially exploded view) depicting the connecting member.
Figure 5B:
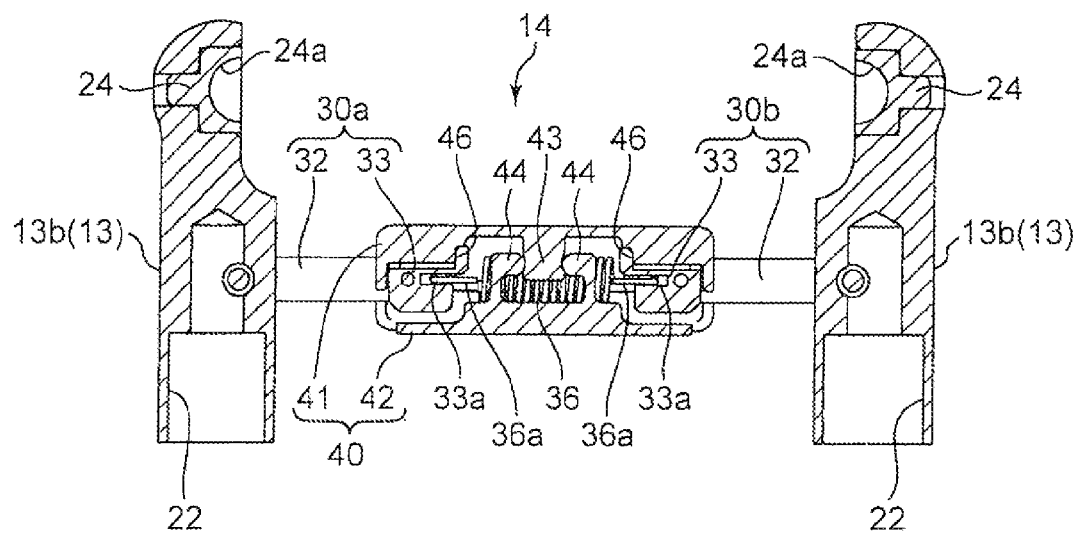
FIG. 5B is a cross-sectional view depicting the connecting member in an assembled state.
Figure 6:
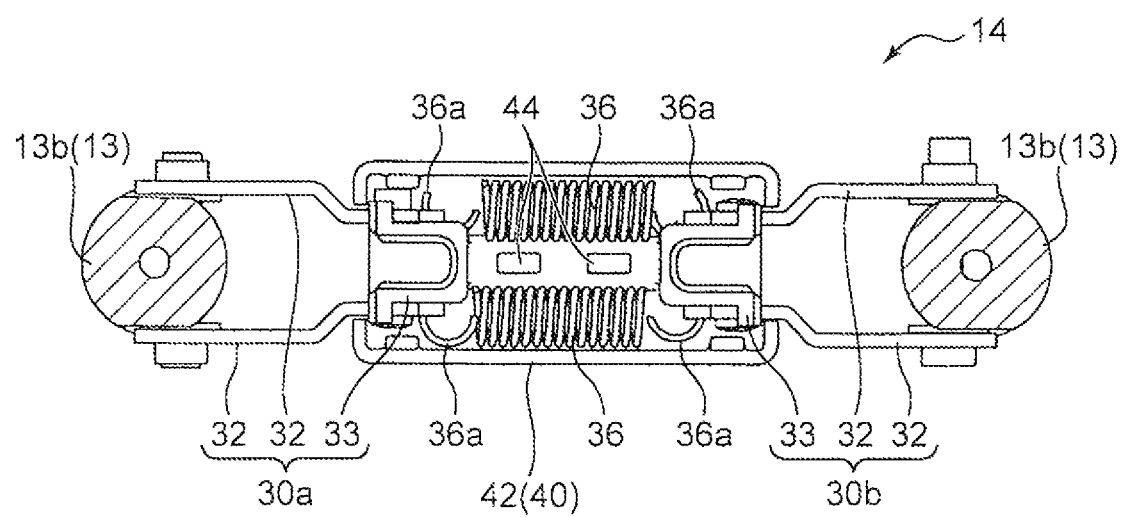
FIG. 6 is a plan view (first cover is removed) depicting the connecting member.

The end cap 13b has a substantially cylindrical shape, and is secured to the end of the rod main unit 13a in a state where the end of the rod main unit 13a fits into a concave portion 22 formed on the base end face (lower end face in FIG. 5A and FIG. 5B). A cup type socket 24 (rod side joint portion) constituting a ball joint, in collaboration with a later mentioned ball stud 17 (counterpart joint portion), is integrated in the tip portion (upper end portion in FIG. 5A and FIG. 5B) of the end cap 13b. This socket 24 is integrated in the end cap 13b sideways, in other words, it is integrated such that a sliding contact face 24a, that receives the ball head portion 17a of the ball stud 17, is in a direction perpendicular to the axis direction of the rod 13.

The rods 13 are interconnected via the connecting member 14 in a state where the sockets 24 face each other. In this example, as FIG. 3 to FIG. 5A and FIG. 5B show, each of the rods 13 is interconnected via the connecting member 14 at the position of the end cap 13b.

The connecting member 14 includes: connecting pieces (first connecting piece 30a and second connecting piece 30b) which are supported by the end caps 13b of the rods 13 extending in directions to approach each other; two spring members 36 which are installed in parallel between the connecting pieces 30a and 30b, so as to bias the rods 13 in directions to approach each other; and a cover member 40 (corresponding to the regulating member of the present invention) which is removably installed between the connecting pieces 30a and 30b, so as to cover the spring members 36, and regulate displacement of the rods 13 in the departing direction, keeping the distance of the rods 13 less than a predetermined distance.

The first connecting piece 30a is configured by: a pair of connecting plates 32, which are located on both sides of the end cap 13b in the diameter direction so as to oscillate around an axis perpendicular to the axis of the end cap 13b; and a spacer 33 which exists between the connecting plates 32, and is secured to the connecting plates 32 by a bolt 34 respectively so that the connecting plates 32 are connected. The second connecting piece 30b has the same configuration as the first connecting piece 30a.

Each of the spring members 36 is an identical tension coil spring having a hook 36a on both ends, and is installed between the connecting plate 32 of the first connecting piece 30a and the connecting plate 32 of the second connecting piece 30b. To be more specific, the spring member 36 is installed between the connecting plate 32 of the connecting piece 30a and the connecting plate 32 of the connecting piece 30b by the hook 36a that is inserted into an engaging hole 32a formed in the tip of the connecting plate 32 respectively.

A slit 33a, which extends to the direction that the connecting plates 32 form a line (direction perpendicular to the page face in FIG. 5A), is formed in the spacer 33 of each of the connecting pieces 30a and 30b so as to open facing each other, as shown in FIG. 5A. The hook 36a of the spring member 36 is constrained from top and bottom (vertical direction in FIG. 5A) by a part of the hook 36a that is inserted into the slit 33a. Thereby unintentional separation of the hook 36a from the engaging hole 32a, due to movement of the hook 36a, can be prevented.

The cover member 40 is a flat rectangular parallelepiped, and is removably installed between the connecting pieces 30a and 30b so as to mainly cover the spring member 36.

As FIG. 4 and FIG. 5A and FIG. 5B show, the cover member 40, disposed in a direction parallel with the axis direction of the rods 13, is configured by a first cover 41 (corresponding to the first unit regulating member of the present invention) which covers the spring member 36 from one side (upper side in FIG. 4 and FIG. 5A and FIG. 5B), and a second cover 42 (corresponding to the second unit regulating member of the present invention) which is inter-fitted to the first cover 41 and covers the spring member 36 from the opposite side (lower side in FIG. 4 and FIG. 5A and FIG. 5B) of the first cover 41.

Each cover 41 and 42 is a plate shape with a peripheral wall portion, and an engaging portion 43 which has concave portions for engagement 43a at the left and right protrudes from the first cover 41 facing the second cover 42. On the other hand, a pair of engaging pieces 44 that can be engaged with the concave portions for engagement 43a protrudes from the second cover 42 facing the first cover 41. Because of this configuration, if these covers 41 and 42 are joined, the peripheral walls of the covers 41 and 42 inter-fit, and the engaging pieces 44 of the second cover 42 sandwich the engaging portion 43 of the first cover 41 at the position between the two spring members 36, and engage with the concave portions for engagement 43a respectively. By this engagement, these covers 41 and 42 are connected (combined). If external force is applied to the combined covers 41 and 42 in the departing directions, the engaged state of the engaging portion 43 and the engaging pieces 44 is released, and the covers 41 and 42 are separated from each other, whereby the cover member 40 can be removed from the connecting pieces 30a and 30b. Because of this configuration, the cover member 40 can be attached to or removed from the connecting pieces 30a and 30b.

Regulating portions 46 are formed in the cover member 40 so that relative displacement of the rods 13 in the departing directions is regulated in a state where the cover member 40 is installed to the connecting pieces 30a and 30b. In concrete terms, as FIG. 5A and FIG. 5B show, the regulating portions 46 are formed on the surface of the first cover 41 facing the second cover 42, so as to engage with each spacer 33 of the connecting pieces 30a and 30b from the outside in the direction where the spacers 33 are lined up (from left and right of the spacers in FIG. 5A and FIG. 5B). In other words, if the rods 13 are displaced in the directions departing from each other, in resistance to the elastic force of the spring member 36, each spacer 33 of the connecting pieces 30a and 30b contacts the regulating portion 46, and as a result, displacement of the rods 13 in the departing directions can be regulated.

The regulating portions 46 are formed to regulate the displacement of the rods 13, so that the distance between the rods 13 becomes less than a predetermined distance at which the connection state of the second arm 12 and the first arm 10 and the connection state of the second arm 12 and the head unit 5 can be maintained. In concrete terms, the distance between the regulating portions 46 is set to regulate the displacement of the rods 13 in the departing directions, so that the state, where the sockets 24 of the rods 13 (end caps 13b) are combined with the first arm 10 and the ball head portions 17a of the later mentioned ball studs 17 of the head unit 5 is maintained. As mentioned later, the sockets 24 of the two rods 13 are formed to have a semicircular cross-section respectively, and the combined state of the socket 24 to the ball stud 17 is released by separating the two rods 13 connected to the first arm 10 and the head unit 5 (ball studs 17) for a predetermined distance or more. The regulating portions 46 regulate the displacement of the two rods 13 so that the distance between the two rods 13 becomes less than the predetermined distance.

The ball stud 17 that constitutes a ball joint, in collaboration with the socket 24 of each rod 13, is assembled respectively in the head unit 5 and the arms 10 to which the second arms 12 are connected.

To be more specific, the bracket 15 of the head unit 5 has a connecting portion 16 of the second arm 12 respectively in a position corresponding to each first arm 10 in the circumferential direction, as shown in FIG. 1 and FIG. 3. Each connecting portion 16 is formed to have an axis that is parallel with the rotation shaft of the corresponding first arm 10 (output axis of the arm driving motor 3), and the ball studs 17 are assembled on both ends in a state of the ball head portions 17a facing opposite directions from each other. In the same manner, the ball studs 17 are assembled on both ends of each first arm 10 in the width direction at the tips of the first arm 10 (both ends in a direction parallel with the output axis of the arm driving motor 3) in a state of the ball head portions 17a facing opposite directions from each other.

As FIG. 1 to FIG. 3 show, the socket 24 of each rod 13 covers (is assembled with) the ball head portion 17a of each ball stud 17 of the first arm 10 from the outside (outside in the width direction of the first arm 10), in the upper end portion of the second arm 12, and the socket 24 of each rod 13 covers the ball head portion 17a of each ball stud 17 of the bracket 15 (connecting portion 16) from the outside (outside in the longitudinal direction of the connecting portion 16), in the lower end portion of the second arm 12. Thereby the second arm 12 (each rod 13) is connected to the first arm 10 and the head unit 5. The socket 24 of each rod 13 and each ball stud 17 collaboratively constitute the ball joint.

The second arm 12 is connected to the first arm 10 and the like in a state where the cover member 40 of the connecting member 14 is removed. In other words, in a state where the cover member 40 is removed, displacement of each rod 13 in the departing directions is not regulated by the regulating portions 46. Therefore the second arm 12 can be connected to the first arm 10 and the like by covering (assembling) the socket 24 of each rod 13 on the ball head portion 17a of each ball stud 17, while separating the rods 13 in resistance to the elastic force of the spring member 36.

Here the socket 24 is relatively shallow with respect to the ball head portion 17a of the ball stud 17. In concrete terms, as FIG. 5A and FIG. 5B show, the socket 24 is formed such that the cross-section of the sliding contact face 24a of the socket 24 is a semicircle. This is in order to secure a wider oscillating range of the second arm 12 with respect to the first arm 10 and the like, and to enable the socket 24 to be attached to or removed from the ball stud 17, that is, to enable the second arm 12 to be attached to or removed from the first arm 10 and the like. In this configuration, the socket 24 easily falls off from the ball stud 17. (In other words, the second arm 12 easily falls off from the first arm 10 and the like.) However the two rods 13 are connected via the connecting member 14 and the two rods 13 are biased in the direction of approaching each other by the elastic force of the spring member 36, as mentioned above, the assembled state of the socket 24 to the ball stud 17 is maintained, and a good connecting state of the first arm 10 and the like and the second arm 12 can be maintained.

According to the robot described above, the position and orientation of the head unit 5 are switched by each arm 6 which is individually driven in a collaborative manner by the arm driving motor 3. Along with this, the rotation shaft 8 is rotary driven by the axis driving motor 4, whereby the nozzle member 18 held by the head unit 5 is rotated.

If this type of robot is operated for a long period of time, the connecting portion of the first arm 10 and the head unit 5 with the second arm 12, that is, the ball head portion 17a of the ball stud 17 and the sliding contact face 24a of the socket 24, start to wear out. However if this second arm 12 is used, the state of the sliding contact face 24a of the socket 24 in contact with the ball head portion 17a of the ball stud 17 is maintained regardless of the wear, since the two rods 13 are biased in a direction of approaching each other by the elastic force of the spring member 36. As a result, the wobble caused by wear of the socket 24 and the like can be prevented, and the second arm 12 can be smoothly operated for a long time.

Furthermore, the regulating portions 46 for regulating displacement of the rods 13 are disposed in the cover member 40 of the connecting member 14, and the rods 13 are regulated so that the relative displacement thereof in the departing directions becomes within a predetermined range, as mentioned above. In concrete terms, the displacement of the rods 13 is regulated in a range where the assembled state of the socket 24 to the ball stud 17 (that is, the connecting state of the second arm 12 to the base unit 1 and the head unit 5) is maintained. Therefore even if the second arm 12 suddenly moves due to a rapid acceleration of the arm 6, or if the arm 6 collides with an article in-transport, the rods 13 are not separated outside the range. As a consequence, according to this robot, such a problem as unintentional fall out of the second arm 12 from the first arm 10, or fall out of the head unit 5 from the second arm 12 during operation, can be prevented.

In the case of maintenance of the arm 6 or cleaning of the head unit 5, on the other hand, the rods 13 can be easily separated outside the range if the cover member 40 of the connecting member 14 is removed and the engaging state of the regulating portions 46 and each connecting piece 30a and 30b is released. Hence the second arm 12 can easily be removed from the first arm 10, or the head unit 5 can easily be removed from the second arm 12. This means that the maintenance operation and cleaning operation of the second arm 12, the head unit 5 and the like can be performed easily and quickly. After such an operation as maintenance, the arm 6 can be returned to the original state by returning the second arm 12 and the head unit 5 in the original state by a reverse procedure, and assembling the cover member 40.

Therefore according to this robot, such a problem as fall out of the second arm 12 and the like during operation can be prevented with more certainty, and if necessary for maintenance or the like, the second arm 12 and other components can easily be removed or disassembled.

Particularly according to the configuration of the connecting member 14, the regulating portions 46 are formed on the cover member 40, therefore a rational configuration that functions as both a member to protect the spring member 36 and as a member to regulate the displacement of the rods 13 in the departing directions (regulating member) can be implemented.

Additionally, the spring member 36 of the connecting member 14 is installed between the connecting plates 32 supported by each rod 13 (end caps 13b). As mentioned above, the spring member 36 is constrained from both the top and bottom sides (both the top and bottom in FIG. 5A and FIG. 5B) by the hooks 36a that are inserted into the slits 33a of the spacers 33 secured to the connecting plates 32. This prevents unintentional disconnection of the spring member 36 from the connecting plates 32. Therefore such a problem as disconnection of the second arm 12 from the first arm 10 due to fall out of the spring member 36 during operation of the robot can be prevented. Furthermore, unintentional disconnection and loss of the spring member 36 during a maintenance operation can be prevented, since the spring member 36 is not so easily disconnected from the connecting plates 32 in this configuration.

The robot described above is an example of a preferred embodiment of the industrial robot according to the present invention (industrial robot to which the arm member according to the present invention is applied), and a concrete configuration can be modified without departing from the spirit of the invention.

For example, for the connecting member 14 used for the second arm 12 according to this embodiment, the connecting member 14 shown in FIG. 7A and FIG. 7B or FIG. 8A and FIG. 8B can be used instead.

Figure 7A:
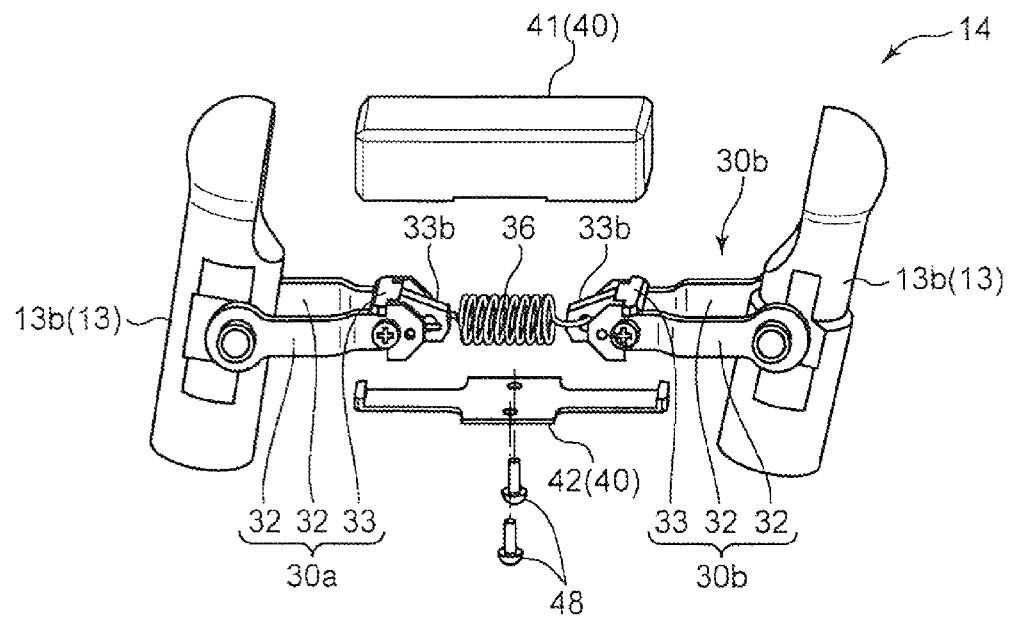
FIG. 7A is a perspective view (partially exploded view) depicting a connecting member according to a modification.
Figure 7B:
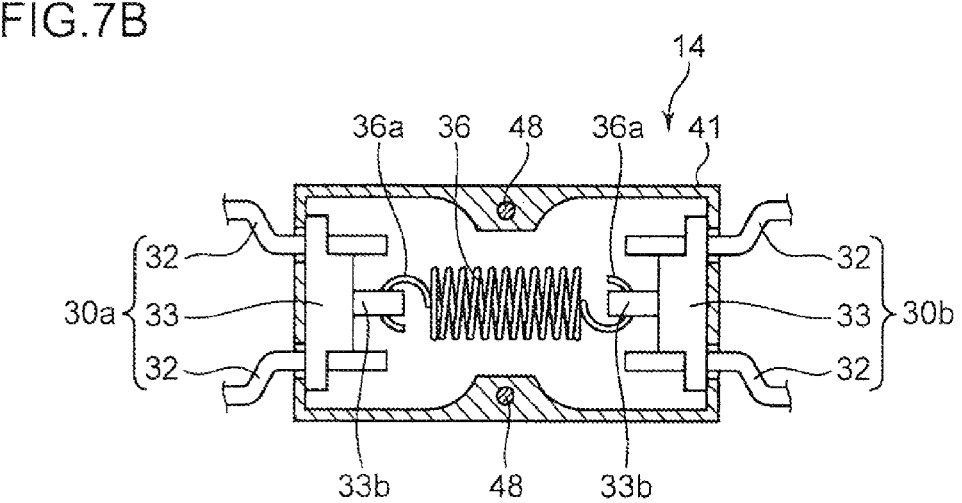
FIG. 7B is a cross-sectional view depicting the connecting member in an assembled state.

The connecting member 14 shown in FIG. 7A and FIG. 7B is a case when only one spring member 36 is used. In this example, the spring member 36 is not installed between the connecting plates 32 of the connecting pieces 30a and 30b, but between the spring engaging portions 33b of the spacers 33. The second cover 42 is a plate type, and the second cover 42 is secured to the first cover 41 by two bolts 48. In this connecting member 14, relative displacement of the connecting pieces 30a and 30b in the departing directions can be regulated by the side walls of the first cover 41 (side walls on the left and right in FIG. 7B) contacting the spacers 33. In other words, in this example, the side wall of the first cover 41 functions as the regulating portions 46.

Figure 8A:
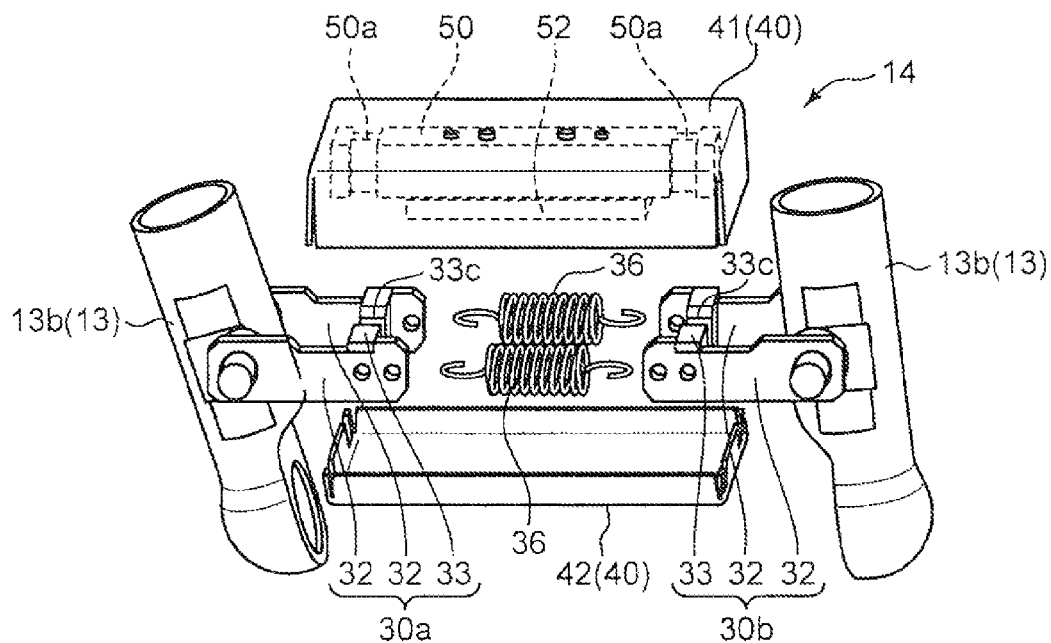
FIG. 8A is a perspective view (exploded view) depicting the connecting member according to the modification.
Figure 8B:
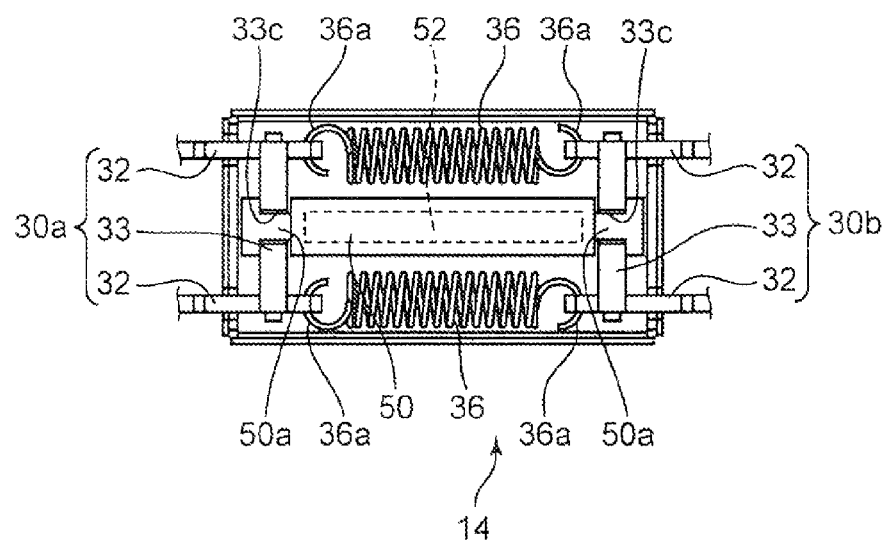
FIG. 8B is a cross-sectional view depicting the connecting member in an assembled state.

The connecting member 14 shown in FIG. 8A and FIG. 8B is a case when the covers 41 and 42 constituting the cover member 40 are secured to each other by magnetic force. In this example, the second cover 42 is formed of stainless steel having magnetic properties. On a ceiling surface inside the first cover 41, that is a surface facing the second cover 42, a columnar member 50, of which cross-section is a rectangle, extends in the direction where the connecting pieces 30a and 30b are lined up (crosswise direction in FIG. 8), and is secured by bolts or the like. A permanent magnet 52 is secured to the end face (bottom surface in FIG. 8A and FIG. 8B) of the columnar member 50. In other words, when the covers 41 and 42 are joined, the covers 41 and 42 are combined together by the magnetic force of the permanent magnet 52. A thin wall portion 50a is formed at positions near both ends of the columnar member 50, and if the covers 41 and 42 are combined as mentioned above, the columnar member 50 exists between the two spring members 36, and the thin wall portion 50a of the columnar member 50 is inserted into a notch portion 33c formed in each spacer 33 respectively, as shown in FIG. 8B. Thereby the columnar member 50 and the spacer 33 are engaged with each other, and displacement of the connecting pieces 30a and 30b in the departing directions is regulated by the columnar member 50. In other words, in this example, the columnar member 50 of the first cover 41 functions as the regulating portions 46. According to the configuration of the connecting member 14 shown in FIG. 8A and FIG. 8B, the cover member 40 can easily be attached to and removed from the connecting pieces 30*a* and 30*b*, and when the cover member 40 is attached to the connecting pieces 30*a* and 30*b*, the two covers 41 and 42 can be stably secured with certainty by the magnetic force of the permanent magnet 52.

As the regulating member of the present invention, the connecting member 14 of this embodiment has the cover member 40 where the regulating portions 46 are formed, but the connecting member 14 may have a dedicated regulating member independent from the cover member 40. For example, the connecting member 14 may have a dedicated regulating member, which is removably installed bridging each connecting piece 30*a* and 30*b*, so as to regulate the relative displacement of the connecting pieces 30*a* and 30*b* in the departing directions. In this case, the cover member 40 may be omitted.

In this embodiment, the connecting member 14 has a configuration to bias the rods 13 in directions to approach each other, using a tension coil spring (spring member 36), but the connecting member 14 may have a configuration to bias the rods 13 using a compression coil spring. In this case, the connecting member 14 can have a configuration conforming to the connecting member disclosed in Japanese Translation of PCT Application No. 2002-529258 in the Background Art section, for example.

In this embodiment, the industrial robot according to the present invention is used for picking up articles, but the industrial robot can be applied to various tasks, and is not limited to picking up articles. In other words, the head unit 5 is not limited to having the nozzle member 18 for suction of an article, as mentioned above, but may have another operating member.

The present invention described above is summarized as follows.

An arm member according to an aspect of the present invention is an arm member that is connected to counterpart member having a pair of counterpart joint portions which faces the opposite side from each other, including: a first rod and a second rod each of which has a rod side joint portion which constitutes a ball joint, in collaboration with the counterpart joint portion, and is connected to the counterpart member by the rod side joint portion that is assembled with the counterpart joint portion; and a connecting member which interconnects the first rod and the second rod which are each connected to the counterpart member, at predetermined positions in the axis direction thereof, wherein the assembled state of the rod side joint portion with the counterpart joint portion is released by separating the two rods, which are connected to the counterpart member, from each other for a predetermined distance or more, and the connecting member includes: a first connecting piece disposed on the first rod; a second connecting piece disposed on the second rod; a spring member which is installed between the two connecting pieces and biases the two rods in directions to approach each other; and a regulating member that is removably installed between the two connecting pieces for regulating displacement of the two rods in departing directions, so that the distance between the two rods becomes less than the predetermined distance.

According to this arm member, displacement of each rod connected to the counterpart member in the departing directions is regulated in a range where the assembled state of the rod side joint portion to the counterpart joint portion is maintained. Therefore even if the arm member suddenly moves due to rapid acceleration, the rods are not separated outside the range, whereby unintentional disconnection of the arm member (rod) from the counterpart member during operation can be prevented. Further, the regulating member is removably installed to the connecting pieces, hence the arm member can easily be removed from the counterpart member during maintenance, by removing the regulating member from the connecting pieces, and separating the rods outside the predetermined distance.

It is preferable that the regulating member has a regulating portion, which engages with the first connecting piece and the second connecting piece so as to regulate displacement of the connecting pieces in the departing directions, and regulates the displacement of the two rods by engaging the regulating portion with each of the connecting pieces.

According to this configuration, displacement of the rods can be regulated more easily using a more compact regulating member, compared with the case of directly regulating the displacement of the rods.

The regulating member may function as a cover member that covers the spring member.

According to this configuration, displacement of each rod can be regulated while covering the spring member for protection. This means that displacement of the rods can be regulated using a rational configuration.

In this case, it is preferable that the regulating member includes a first unit regulating member and a second unit regulating member which collaboratively cover the spring member by sandwiching the spring member from both sides in the axis direction of the rods, and has the regulating portion at least in one of the unit regulating members.

According to this configuration, the regulating member can easily be installed to the connecting pieces by sandwiching the spring member by each unit regulating member from both sides, and combining these unit regulating members. To remove the regulating member for the connecting pieces, the removal operation can easily be performed by separating each unit regulating member from each other, so as to disassemble the regulating members.

In this case, it is preferable that the first unit regulating member has a magnet and the second unit regulating member is formed of a magnetic material so that the second unit regulating member is secured to the first unit regulating member by the magnetic force of the magnet.

According to this configuration, the regulating member can be attached to or removed from the connecting piece by a one touch operation, without using a bolt or the like. Therefore the attaching/removing operation can be performed more easily and quickly.

An industrial robot according to an aspect of the present invention is an industrial robot using a parallel link mechanism, which includes: a base unit; an end effector; a plurality of arms that connects the base unit and the end effector; and a plurality of motors that is installed to the base unit and that drives the arms respectively, so as to move the end effector by driving each of the arms, wherein each of the arms has a first arm that is driven by the motor, and a second arm that connects the first arm and the end effector, and the second arm is the arm member according to the aspect, and is connected to the first arm and the end effector, regarding the first arm and the end effector as the counterpart members.

According to this industrial robot, the functional effect equivalent to the functional effect by the arm member, described above, can be implemented.

INDUSTRIAL APPLICABILITY

As described above, the present invention allows totally preventing a problem of fall out of the arm during an operation of such a robot, as an industrial robot using a parallel link mechanism, and also allows easy removal or disassembly of the arm if necessary during maintenance. Therefore the present invention contributes to improvement maintainability of various operations performed by the industrial robot.

This application is based on Japanese Patent application No. 2012-221099 filed in Japan Patent Office on Oct. 3, 2012, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An arm member that is connected to counterpart members each having a pair of counterpart joint portions which faces the opposite side from each other, comprising:
   a first rod and a second rod each of which has a rod side joint portion which constitutes a ball joint, in collaboration with the counterpart joint portion, and is connected to the counterpart member by the rod side joint portion that is assembled with the counterpart joint portion;
   a first connecting piece disposed at a predetermined axial position of the first rod;
   a second connecting piece disposed at an axial position of the second rod corresponding to the position of the first connecting piece;
   a spring member extending between and directly connected to the first connecting piece and the second connecting piece, the spring member biasing the connecting pieces in directions to approach each other in such a way as to keep the first rod and the second rod at less than a predetermined distance from each other, the predetermined distance at which the assembled state of the rod side joint portion with the counterpart joint portion being released; and
   a regulating member including a pair of regulating portions which are disposed at a predetermined distance from each other in an arrangement direction of the first rod and the second rod, and are respectively engaged with the first connecting piece and the second connecting piece to regulate displacement of the connecting pieces in departing directions, wherein
   the regulating member includes a first unit member and a second unit member combined in such a way as to sandwich the connecting pieces from both sides in the axial direction of the rods, and
   each of the first unit member and the second unit member includes a coupling portion which keeps the combined state of the unit members and permits the unit members to be released from each other upon application of an external force to the, wherein
   the spring member is in the form of a tension coil spring extending between the first connecting piece and the second connecting piece; each of the first connecting piece and the second connecting piece includes an engaging portion disposed outside the spring member in the arrangement direction of the first rod and the second rod; and the regulating member is in the form of a box including a peripheral wall portion which encloses the spring member and is engaged with the engaging portions from the outside in the arrangement direction of the first rod and the second rod, the peripheral wall portion serving as the regulating portions.

2. The arm member according to claim 1,
   the first unit member and the second unit member collaboratively cover the spring member, and the of regulating portions are provided at least in one of the first unit member and the second unit member or provided respectively in the first unit member and the second unit member.

3. An industrial robot using a parallel link mechanism, the robot comprising: a base unit; an end effector; a plurality of arms that connects the base unit and the end effector; and a plurality of motors that is installed to the base unit and drives the arms respectively, so as to move the end effector by driving each of the arms, wherein
   each of the arms has a first arm that is driven by the motor, and a second arm that connects the first arm and the end effector, and
   the second arm is the arm member according to claim 1, and is connected to the first arm and the end effector, regarding the first arm and the end effector as the counterpart members.

4. The arm member according to claim 1, wherein
   the coupling portion of the first unit member is formed on a surface of the first unit member that faces the second unit member, and the coupling portion of the second unit member is formed on a surface of the second unit member that faces the first unit member, and
   the coupling portions are each in the form of a hook, and engage with and disengage from each other upon application of an external force equal to or greater than a predetermined value to the unit members in the axial direction.

* * * * *